(12) United States Patent
Palmersheim (10) Patent No.: US 8,627,529 B1
(45) Date of Patent: Jan. 14, 2014

(54) CENTRALIZED AIR SUPPLY LOADING DOCK LEVELING SYSTEM (75) Inventor: Gerard Martin Palmersheim, Hubertus, WI (US)

(73) Assignee: Systems, Inc., Germantown, WI (US)

( * ) Notice: Subject to any disclaimer, the term of this patent is extended or adjusted under 35 U.S.C. 154(b) by 0 days.

(21) Appl. No.: 13/325,059

(22) Filed: Dec. 14, 2011

(51) Int. Cl.
*E01D 1/00* (2006.01)
(52) U.S. Cl.
USPC ........................................ 14/71.3
(58) Field of Classification Search
USPC ................. 14/69.5, 71.1, 71.3, 71.5
See application file for complete search history.

(56) References Cited

U.S. PATENT DOCUMENTS

| | | | | |
|---|---|---|---|---|
| 2,643,010 A * | 6/1953 | Hott et al. | | 414/584 |
| 3,995,342 A * | 12/1976 | Wiener | | 14/71.3 |
| 4,081,874 A * | 4/1978 | Artzberger | | 14/71.7 |
| 4,692,755 A * | 9/1987 | Hahn | | 340/687 |
| 4,744,121 A * | 5/1988 | Swessel et al. | | 14/71.7 |
| 4,843,373 A * | 6/1989 | Trickle et al. | | 340/540 |
| 5,168,267 A * | 12/1992 | Trickle | | 340/988 |
| 5,500,968 A * | 3/1996 | Hodges | | 14/71.7 |
| 5,522,107 A * | 6/1996 | Hageman et al. | | 14/69.5 |
| 5,522,108 A * | 6/1996 | Massey et al. | | 14/71.7 |
| 5,526,545 A * | 6/1996 | Alexander | | 14/71.3 |
| 5,826,291 A * | 10/1998 | Alexander | | 14/71.3 |
| 5,831,540 A * | 11/1998 | Sullivan et al. | | 340/679 |
| 6,276,016 B1 * | 8/2001 | Springer | | 14/71.1 |
| 6,812,849 B1 * | 11/2004 | Ancel | | 340/686.1 |
| 8,065,770 B2 * | 11/2011 | Proffitt et al. | | 14/69.5 |
| 2002/0140390 A1 * | 10/2002 | Lounsbury | | 318/560 |
| 2006/0051196 A1 * | 3/2006 | McDonald | | 414/809 |
| 2006/0181391 A1 * | 8/2006 | McNeill et al. | | 340/5.61 |
| 2010/0269273 A1 * | 10/2010 | Proffitt et al. | | 14/71.3 |
| 2011/0258788 A1 * | 10/2011 | Ion | | 14/71.3 |
| 2012/0131755 A1 * | 5/2012 | Luu et al. | | 14/71.3 |

* cited by examiner

*Primary Examiner* — Matthew D Troutman
(74) *Attorney, Agent, or Firm* — Mann Law Group (57) ABSTRACT

A central pressurized air supply selectively couples pressurized air to one or more dock levelers to pivot a hinged ramp of a dock leveler. Each dock leveler includes an inflatable member to which the pressurized air is selectively coupled, and the inflatable member is arranged to pivot about the hinged ramp of a respective dock leveler. A control system allows continued operation of the system during adverse conditions.

23 Claims, 5 Drawing Sheets

CENTRALIZED AIR SUPPLY LOADING DOCK LEVELING SYSTEM

BACKGROUND

Loading docks include dock levelers that are used to provide a hinged ramp such as a dock board to accommodate varying distances in height between a loading dock and a vehicle from which cargo is to be loaded or unloaded. Conventionally, mechanical, hydraulic, and pneumatic dock leveler systems are used to pivot the ramp to accommodate the varying distances. For example, a conventional pneumatic dock leveler uses an inflatable member or airbag to raise and lower the ramp. Such dock leveler systems are disclosed in U.S. Pat. No. 6,360,393, which is hereby incorporated by reference in its entirety.

While the use of pneumatic components in loading dock systems has simplified maintenance and operational requirements in loading dock systems, the pneumatic components still often require maintenance that can result in costly downtime of the loading docks. For example, conventional pneumatic loading dock levelers include a blower and an inflatable member such as an airbag, both of which are typically located beneath the hinged ramp of the dock leveler. Maintenance of the components is difficult because accessing the "hidden" components often requires removal of the hinged ramp, which results in "downtime" of the dock leveler.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

A system and method is disclosed herein for providing a centralized pressurized air supply for pivoting a hinged ramp by selectively inflating an inflatable member of an inflatable lifting assembly. The central pressurized air supply includes a blower and/or pressurized air vessel that is located in an easily accessible central (or centralized) location and that is arranged to selectively couple pressurized air to one or more dock levelers via a compressed air distribution system. Each dock leveler includes an inflatable member to which the pressurized air is selectively coupled, and the inflatable member is arranged to raise and lower one end of the hinged ramp of a dock leveler.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. The disclosure herein is, therefore, not to be taken in a limiting sense.

DETAILED DESCRIPTION

Various embodiments will be described in detail with reference to the drawings, wherein like reference numerals represent like parts and assemblies throughout the several views. Many details of certain embodiments of the disclosure are set forth in the following description and accompanying figures so as to provide a thorough understanding of the embodiments. Reference to various embodiments does not limit the scope of the claims attached hereto. Additionally, any examples set forth in this specification are not intended to be limiting and merely set forth some of the many possible embodiments for the appended claims.

Figure 1:
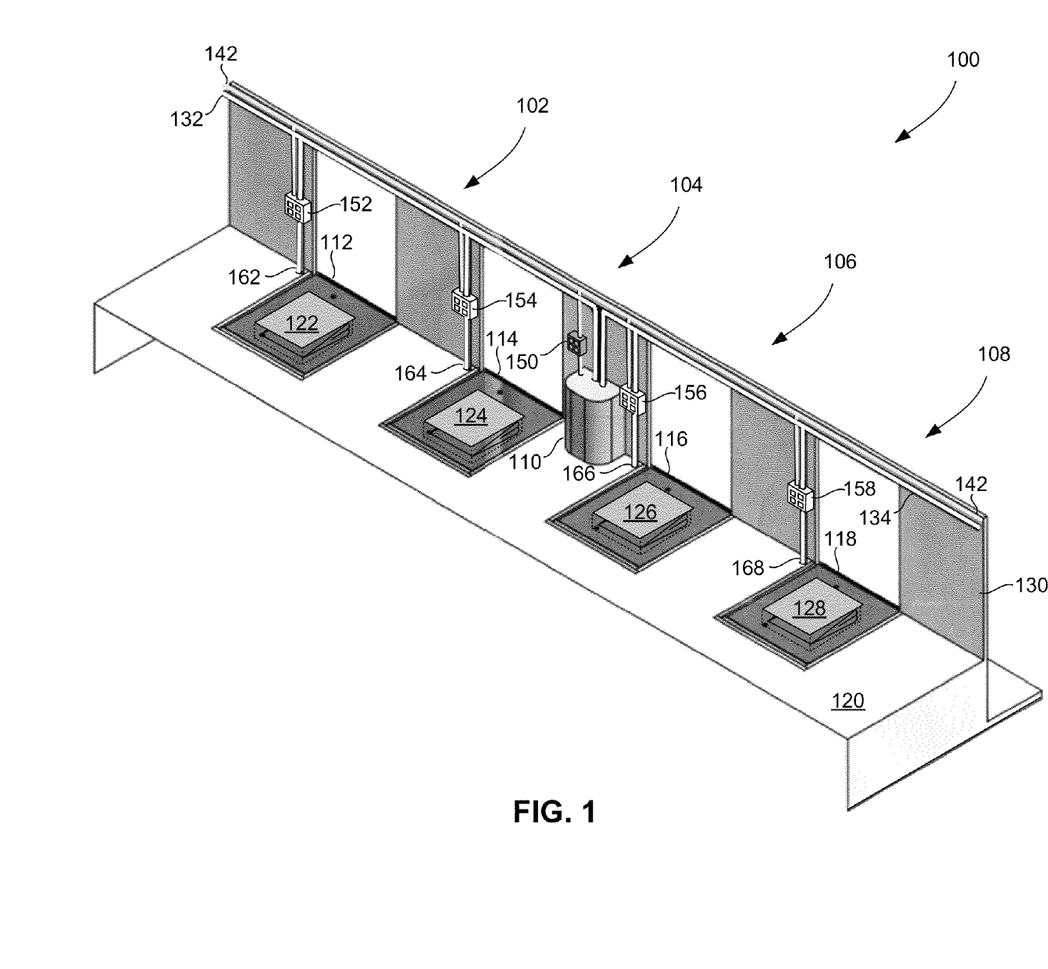
FIG. 1 is an isometric view illustrating an embodiment of a centralized air supply dock leveling system.

FIG. 1 is an isometric view illustrating an embodiment of a centralized air supply dock leveling system. The dock leveling system 100 includes a loading dock 120 in which bay 102, bay 104, bay 106, and bay 108 are arranged. Bay 102 includes a hinged ramp 112 that is hinged at a proximal edge (see, for example, ramp 304 in FIG. 3). An inflatable bag (such as an airbag, inflatable bellows, balloon, bladder, expansive chamber, pneumatic cylinder, and the like) 122 is arranged in a pit underneath ramp 112 so as to raise and lower a distal edge of ramp 112. A local control box 152 is provided to provide control for an operator standing adjacent to the ramp 112 to raise or lower the distal edge of the ramp 112.

Likewise, bay 104 includes a hinged ramp 114 that is hinged at a proximal edge with an inflatable bag 124 arranged beneath ramp 114 so as to raise and lower a distal edge of ramp 114 using a local control box 154 to raise or lower the distal edge of the ramp 114; bay 106 includes a hinged ramp 116 that is hinged at a proximal edge with an inflatable bag 126 arranged beneath ramp 116 so as to raise and lower a distal edge of ramp 116 using a local control box 156 to raise or lower the distal edge of the ramp 116; and bay 108 includes a hinged ramp 118 that is hinged at a proximal edge with an inflatable bag 128 arranged beneath ramp 118 so as to raise and lower a distal edge of ramp 118 using a local control box 158 to raise or lower the distal edge of the ramp 118. More (or less) bays can be included (or excluded) depending on the loading dock "throughput" that is needed or anticipated by a business operating the loading dock.

The dock leveling system 100 also includes a centralized air supply 110 that is coupled to control boxes 152 and 154 via air line 132 and coupled to control 156 and 158 via air line 134. Air lines 132 and 134 can be (for example) connected to each other or coupled to a common pressure chamber (e.g., air tank) using check-valves so that a loss of air pressure in one line does not affect the second air line.

Control box 152 is a local control box that selectively couples air line 132 to air line 162, which in turn is coupled to inflatable bag 122. Control box 154 is a local control box that selectively couples air line 132 to air line 164, which in turn is coupled to inflatable bag 124. Control boxes 152 and 154 are thus arranged to respectively control the inflation of inflatable bags 122 and 124.

Control box 156 is a local control box that selectively couples air line 134 to air line 166, which in turn is coupled to inflatable bag 126. Control box 158 selectively couples air line 134 to air line 168, which in turn is coupled to inflatable bag 128. Control boxes 156 and 158 are thus arranged to respectively control the inflation of inflatable bags 126 and 128.

In operation (for example), a user standing adjacent to ramp 112 can depress a button on control box 152 to raise (or lower) the distal portion of ramp 112. When the appropriate button is pressed to raise the ramp (such as before a truck backs closely into the bay 102), a valve in control box 152 (or in the alternative, the valve may be located elsewhere) opens to couple pressurized air from the centralized air supply 110 to the inflatable bag 122, which further inflates the inflatable bag 122 and thus raises the distal portion of ramp 112. Air is then transferred in accordance with a pressure gradient from the centralized air supply 110 (which is replenished by a compressor or other source of pressurized air that is inside of or coupled to the centralized air supply 110) to the inflatable bag 122.

When the inflation button is released, the valve to air line 162 closes, which seals pressurized air in the inflatable bag 122 (irrespective of subsequent pressure changes in air line 132). The user can depress a "lock" button on the control box 152 that helps to maintain air pressure (due to leaks, for example) in the inflatable bag 122 by evaluating a pressure sensor reading (such as pressure sensor 324 shown in FIG. 3) and automatically actuating the valve to air line 162 to raise the pressure to the level at which the pressure was at the time the lock button was pressed.

The distal portion of ramp 112 can be lowered in response to a user depressing a "lower ramp" button, which allows pressurized air to escape from the inflatable bag 122 via a selectively controlled pressure release valve (not shown). The ramp is lowered until the user releases the "lower ramp" button, which closes the pressure release valve.

Thus, the user can selectively raise the distal portion of the ramp 112 above the level of a truck bed to be docked at the bay 102, wait until the truck bed is suitably positioned (such as when a rear edge of the truck bed extends inwards from the distal edge of the ramp 112), and press the "lower ramp" button until a distal portion of ramp 112 contacts the bed of the truck. The variable-height ramp 112 allows the contents of the truck bed to unloaded from the truck bed without materiel handlers having to negotiate a step formed by differing levels of the loading dock 120 and the truck bed.

After unloading is finished, the ramp can be raised by the user pressing the "raise ramp" button, to allow the truck to depart free of the ramp 112. After the truck has departed, the user can press the "lower ramp" button to return the ramp 112 to a neutral position that is level with the surface of loading dock 120. (Further modes of operation are discussed with respect to FIG. 3 below.)

Master control box 150 is a master control box that is arranged to coordinate functions of each of the (local) control boxes 152, 154, 156, and 158. The master control box 150 is coupled to each of the control boxes 152, 154, 156, and 158 via control lines 142. Thus, each of the inflatable air bags 122, 124, 126, and 128 can be inflated under the control of the respective local control box and/or under the control of the master control box 150. Further, the master control box 150 can be arranged to apply ("turn on") or remove ("turn off") power from the dock leveling system 100. Master control box 150 can be coupled to the centralized air supply 110 to control, for example, turning a compressor coupled to a pressure chamber "on" or "off," setting a pressure limit at which the compressor automatically turns off, setting a power saving mode, and the like. The functions of master control box can be implemented within a local control box, which eliminates the need for a separate housing for the control box.

The functions of master control box 150 also include the ability to arbitrate commands from each of the local control boxes (such as when "raise ramp" buttons from multiple control boxes are nearly simultaneously depressed). For example, when faster inflation of an inflatable bag is desired (such as when operating in a low power mode), priority can be given to the button that was pushed first (or in the alternative, the last-pushed button) so that stored pressurized air can be delivered to the inflatable bag to the bay that is assigned priority. Likewise, the master control box 150 can direct the compressor, for example, to increase the rate at which the pressurized air is supplied and/or produced when multiple "raise ramp" buttons are pressed simultaneously (or nearly simultaneously).

The components of dock leveling system 100 are arranged to be easily installed as, for example, an upgrade kit that is used to upgrade from a (relatively environmentally unfriendly) hydraulically actuated system to a (more environmentally friendly) pneumatically actuated system.

For example, the master control box 150 and the centralized air supply 110 can be arranged in a central location between bay doors. Control lines 142 and air lines 132 and 134 care routed over the bay doors. The inflatable bags (e.g., inflatable bag 122) can be relatively easily placed in the pit beneath each ramp (e.g., ramp 112) when the ramp is removed for maintenance. Likewise, the selectively coupled air line (e.g., air line 162) can be routed through a portion of the loading dock 120 surface (e.g., adjacent to the bay door and the ramp pit) that is relatively easily evacuated with hand tools. Thus, no control lines and air lines lie on an exposed horizontal surface, where the integrity of the lines could be compromised by foot or hand truck traffic, for example.

Additionally, a local control box (such as control box 156) can include the functionality and controls of the master control box 150 to minimize the number of components installed. Likewise, a valve can be fitted with each local control box to minimize component counts and simplify installation.

Figure 2:
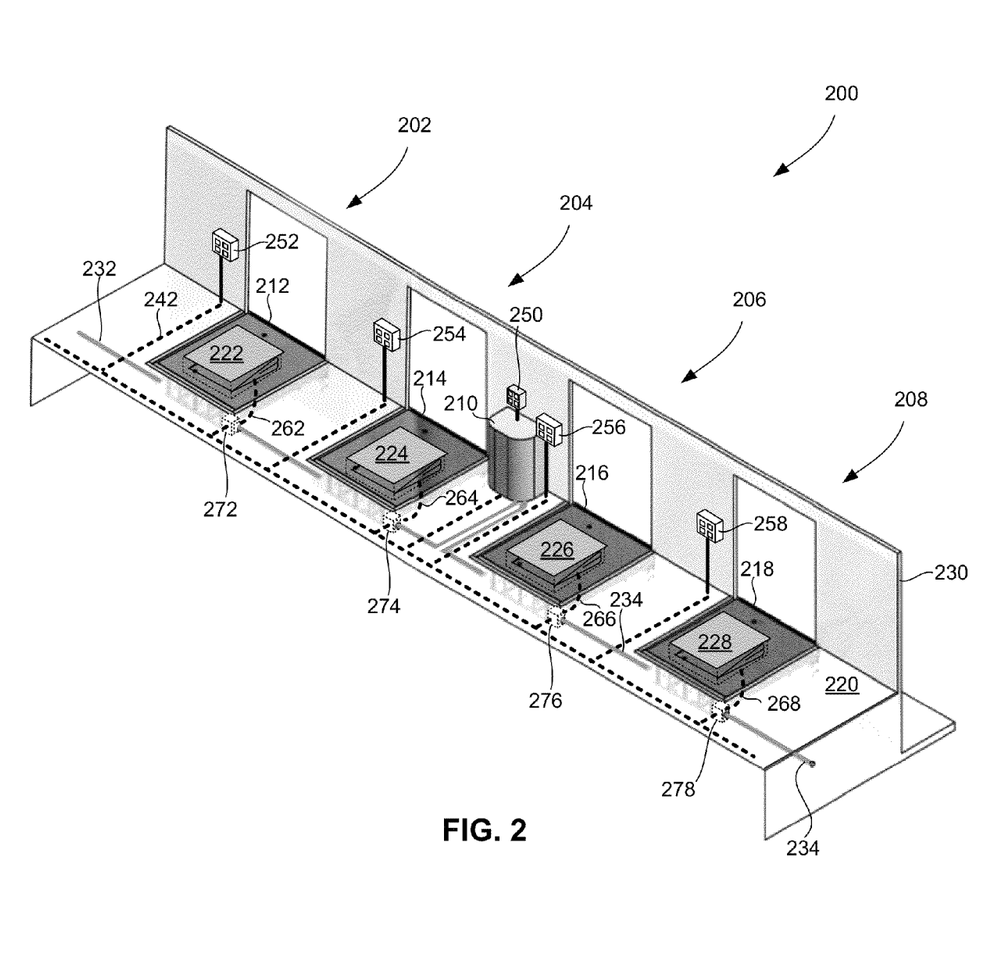
FIG. 2 is an isometric view of an embodiment of centralized air supply dock leveling system in a built-in configuration.

FIG. 2 is an isometric view illustrating an embodiment of a centralized air supply dock leveling system arranged in a built-in configuration. The dock leveling system 200 includes a loading dock 220 into which bay 202, bay 204, bay 206, and bay 208 are arranged. Bay 202 includes a hinged ramp 212 that is hinged at a proximal edge. An inflatable bag 222 is arranged in a pit underneath ramp 212 so as to raise and lower a distal edge of ramp 212. A local control box 252 is provided to provide control for an operator standing adjacent to the ramp 212 to raise or lower the distal edge of the ramp 212.

Likewise, bay 204 includes a hinged ramp 214 that is hinged at a proximal edge with an inflatable bag 224 arranged beneath ramp 214 so as to raise and lower a distal edge of ramp 214 using a local control box 254 to raise or lower the distal edge of the ramp 214; bay 206 includes a hinged ramp 216 that is hinged at a proximal edge with an inflatable bag 226 arranged beneath ramp 216 so as to raise and lower a distal edge of ramp 216 using a local control box 256 to raise or lower the distal edge of the ramp 216; and bay 208 includes a hinged ramp 218 that is hinged at a proximal edge with an inflatable bag 228 arranged beneath ramp 218 so as to raise and lower a distal edge of ramp 218 using a local control box 258 to raise or lower the distal edge of the ramp 218. More (or less) bays can be included (or excluded) depending on the loading dock "throughput" that is needed or anticipated by a business operating the loading dock.

The dock leveling system 200 also includes a centralized air supply 210 that is coupled to control boxes 252 and 254 via air line 232 and coupled to control 256 and 258 via air line 234. Air lines 232 and 234 can be laid beneath the surface of loading dock 220 during construction of the dock, for example. Air lines 232 and 234 can be (for example) connected to each other or commonly coupled to a common pressure chamber (e.g., air tank) using a check-valve between each air line and chamber so that a loss of air pressure in one line does not affect the second air line.

Control box 252 is a local control box that selectively couples air line 232 to air line 262 using valve 272. Air line 262 is coupled to inflatable bag 222. Control box 254 is a local control box that selectively couples air line 232 to air line 264 using valve 274. Air line 264 is coupled to inflatable bag 224. Control boxes 252 and 254 are thus arranged to respectively control the inflation of inflatable bags 222 and 224. Valves 272 and 274 are electrically actuated by control boxes 252 and 254 (respectively) to selectively open and close the valves.

Control box 256 is a local control box that selectively couples air line 234 to air line 264 using valve 276. Air line 264 is, in turn, coupled to inflatable bag 226. Control box 258 selectively couples air line 234 to air line 268 using valve 278. Air line 268 is coupled to inflatable bag 228. Control boxes 256 and 258 are thus arranged to respectively control the inflation of inflatable bags 226 and 228. Valves 276 and 278 are electrically actuated by control boxes 256 and 258 (respectively) to selectively open and close the valves.

In operation the components of dock leveling system 200 operate similarly to the corresponding components of dock leveling system 100. Dock leveling system 200 also offers an additional level of protection: because dock leveling system is built in, many (if not all) of the control and air lines lie beneath protective surfaces, which protects those components and reduces maintenance that otherwise would be required to repair damage to the components.

Figure 3:
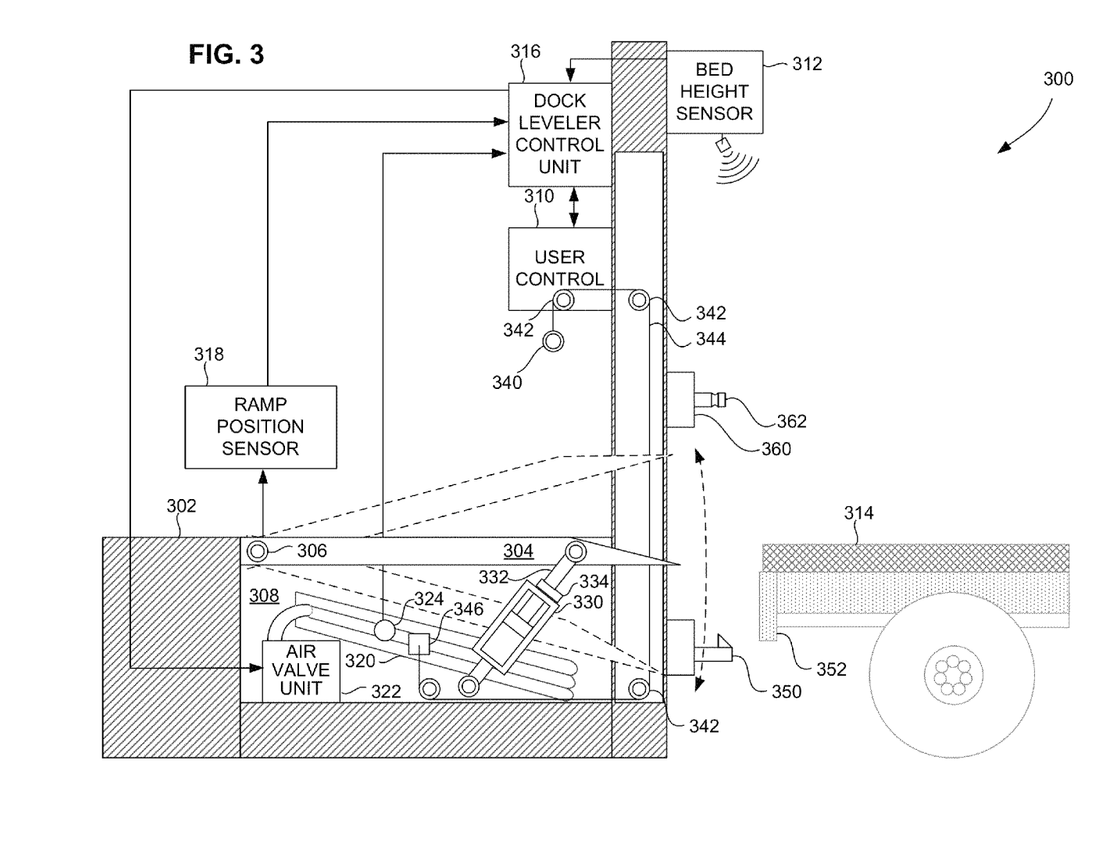
FIG. 3 is a schematic diagram illustrating an embodiment of a centralized air supply dock leveling system.

FIG. 3 is a schematic diagram illustrating an embodiment of a centralized air supply dock leveling system. The docking system 300 is depicted in a cross-section taken through a loading dock 302 bay. The loading dock 302 includes one or more bays as illustrated in FIG. 1 and/or FIG. 2. As shown in cross-section, ramp 304 is pivotally attached to loading dock 302 by a hinge 306 at a proximal edge. An inflatable bag 320 is arranged in a pit 308 underneath ramp 304 so as to raise and lower the distal edge of ramp 304.

A user activates controls (such as a push buttons, levers, switches, and the like) on user control 310 (for example) to raise or lower the ramp 304. The user control 310 provides a control interface to the dock leveler control unit 316 for proving commands for and receiving status indications from the dock leveler control unit 316 (for example, an "in use" indication can be used to warn operators of other bays that another ramp is being raised (which may lower available air pressure). For convenience, the user control module 310 (including the user control units from other bays) may be included in the dock leveler control unit 316 housing and electronic circuits. For example, a combined user control module 310 and dock leveler control unit 316 can be used as a master control unit for controlling all units to provide redundancy and arbitration, while other (local) control units 310 can be provided to control individual bays. The user control 310 can also be a wireless device that is hand-held.

Dock leveler control unit 316 is coupled to a bed height sensor 312 that is arranged to determine a height of a truck (or other vehicle) bed 314 for which the ramp 304 is to be adjusted. In an embodiment, bed height sensor 312 is an acoustic, optical, or radio- or microwave-frequency range finder that determines the relative distance between the top of the truck bed 314 and the bed height sensor 312. Dock leveler control unit 316 uses the position and the relative angle of the positioning of the bed height sensor 312 and the measured relative distance to determine the height of the truck bed. The bed height sensor 312 is typically located on an outside surface of the loading dock 302 in a central location over a bay door, which provides an unobstructed "view" of the truck bed 314 as the truck is backed in closely to the bay door. The bed height sensor can scan and/or nutate within the plane of the illustrated cross-section to create a time-variant electronic profile used to determine the distance and height of the back end of the truck bed 314.

Dock leveler control unit 316 is also coupled to a ramp position sensor 318 that is used to determine a height for the proximal edge of the ramp 304. In an embodiment, the ramp position sensor determines the degree of rotation (e.g., angle) of the ramp 304 about the hinge 306 to which the proximal edge of the ramp 304 is affixed. The position of the hinge 306, the angle of the ramp 304, and the distance of the proximal edge to the distal edge of the ramp 304 (as well as other factors) are used to determine the height of the distal edge of the ramp 304.

In operation, a user activates a control on user control 310 to raise the distal portion of ramp 304 above the truck. Dock leveler control unit 316 instructs air valve unit 322 to supply pressurized air to the inflatable bag 320 for raising and lowering the ramp 304. The activation of the "raise ramp" button can be a "fire and forget" command where the user depresses and releases the "raise ramp" button while the dock leveler control unit 316 continues to direct the air valve unit 322 to inflate the inflatable bag 320 until the ramp position sensor 318 indicates a safe angle of the ramp 304 to permit safe docking. The "fire and forget" command can be countermanded (canceled) by, for example, pressing a "stop" button or a "lower ramp" button on the user control.

As the truck bed approaches, the bed height sensor 312 monitors the electronic profile and the degree of rotation of the ramp 304 to determine if the proximal edge of ramp 304 is progressing past (or has progressed past) the height of the truck bed 314. If the indicated angle is not "safe," the dock leveler control unit 306 can provide an audible/visual warning, as well as prioritize the delivery of pressurized air to the bay in the warning condition to speed the inflation of the associated inflatable bag 320.

The delivery of pressurized air to the bay in the warning condition can be accomplished by closing (e.g., turning off) valves currently being used to raise ramps in other bays, as well as to increase the current and pressure of the pressurized air. The current and pressure of the pressurized air can be increased by directing the compressor for the centralized air supply to increase the rate of air compression (such as by using a higher speed on a multi-speed motor), activating a parallel compressor, coupling an emergency high pressure supply to the air line, and the like.

After the truck bed 314 is docked, the user activates a control on the user control to lower the distal portion of ramp 304 to the truck bed. The dock leveler control unit releases pressure from air valve unit 322 (for example) to lower the distal portion of ramp 304 to the truck bed 314. The dock leveler control unit 316 can automatically stop (cutoff) the deflation of the inflatable bag 320 when the distal portion of ramp 304 is substantially lowered to the level of the truck bed 314 despite the continued application of pressure to the "lower ramp" button by the operator. The cutoff angle (or position) can be determined, for example, by the level of the truck bed 314 as determined using the bed height sensor or a contact sensor (not shown) arranged adjacent to the distal edge of ramp 304. The operator can override the automatic cutoff by releasing and re-pressing the "lower ramp" button.

The dock leveler control unit can determine the presence of an air leak (when the inflatable bag 320 is in a pressurized state) by monitoring the angle of ramp 304 and the pressure of the inflatable bag 320 by reading air pressure sensor 324. For example, when the angle of ramp 304 does not change substantially (such as when resting upon truck bed 314) and the pressure decreases in inflatable bag 320, The dock leveler control unit can notify the user (through the user control 310, for example) of the presence of the leak and in which bay the leak occurs.

When the materiel handlers have finished loading and/or unloading truck bed 314, the operator can depress the "raise ramp" button (as described above) to raise the distal portion of the ramp 304 to free the surface of the truck bed 314 from the distal edge of ramp 304. After the vehicle of truck bed 314 departs, the user can press the "lower ramp" button to lower the distal portion of the ramp 304 to a neutral position such as indicated by an angle of 0 (zero) degrees relative to the plane of the loading dock 302 surface.

Cylinder 330 is optionally provided in conjunction with the inflatable bag 320 and is arranged to function as a braking device in the event the support device for the dock leveler is removed unexpectedly (e.g., such as when a truck upon which the distal portion of ramp 304 is supported departs before the ramp is raised). Cylinder 330 is typically mounted beneath ramp 304 having a upper portion that is rotatably affixed to a distal portion of ramp 304 and a lower portion that is rotatably affixed to a surface of pit 308 (other arrangements are possible).

Clutch unit 334 is (optionally) arranged on the upper portion of cylinder 330 and is activated to impede the linear travel of piston 332 (of the upper portion of cylinder 330) to slow the acceleration of the piston 332 when ramp 304 is suddenly lowered. Clutch unit 334 can be activated in response to changes in air pressure detected, for example, in piston 330, in inflatable bag 320 (via pressure sensor 324), in air valve unit 322, and/or relief valve 346 (discussed below).

Relief valve 346 is arranged to operate in conjunction with (or independently of) of an optional air pressure relief valve (not shown) in air valve unit 322. In an embodiment, a user may use pull chain 340 to actuate relief valve 346 via a mechanical force transferred to the relief valve 346 via pulleys 342 and cable 344. The mechanical force may be opposed by an opposing force provided by, for example, a spring that is compressed or tensioned in response to a user pulling on the pull chain 340. The opposing force can be used to close the air pressure relief valve, or to latch the pressure relief valve 346 in an open state until a subsequent pull of the pull chain 340 releases a latching mechanism so that the pressure relief valve 346 returns to a closed state. Mechanical controls (such as pull chain 340) can be also used to control the inflation of air bag 320 by selectively opening a valve in the air valve unit 322 to couple the pressurized air supply to the air bag 320.

Using mechanical controls (in conjunction with or in replacement of components such as electrical control mechanisms such as dock leveler control unit 316) allows the system to operate when the loss of electrical power (including flooding or rain-storm conditions when application of electrical power poses a hazard to human life or health) is encountered. The mechanical controls can thus continue to operate when a portion of at least one loading dock is submerged in water, for example, by storing pressurized air (as discussed below with respect to FIG. 5 in the optional system reservoir 522).

The stored pressurized air is selectively coupled to the inflatable air bag 320 in response to a user manipulating (including other intentional mechanical motivations) a mechanically actuated linkage that is arranged to inflate and/or deflate the inflatable air bag 320. Additionally, the use of pneumatic systems alleviates special handling procedures and expenses associated with using and cleaning hydraulic systems and the potential of environmental harm resulting from escape of the hydraulic fluid to the environment.

In an embodiment, the pressure relief valve 346 includes an air velocity fuse for detecting a relatively high flow rate of air (such as might be expected when a truck suddenly departs with the ramp 304 in a lowered position). In a situation where pressure relief valve 346 is latched in an open state, the air velocity fuse is arranged to detect the high flow rate of air and, in response to the detection of the high flow rate of air, to block and/or limit the flow of air from the inflatable bag 320. For example, the high flow rate of air can be used to close a check valve that resets automatically when the flow rate of air decreases below a threshold (the rate of air flow at which the check valve resets may be set below the threshold of the high flow rate of air used to block the flow of air).

Restraint 350 is selectively coupled to the pressurized air supply and is arranged to restrain, for example, a truck having a bed 314 that is supporting (and/or partially supporting) ramp 304 (which then prevents an inattentive driver from driving the truck away while the bed 314 is still supporting the ramp 304). Restraint 350 is arranged to engage and disengage from a locking station 352 (such as a rear impact guard) of the truck. Restraint 350 is selectively coupled to the pressurized air supply, for example, in response to a command (and/or a sequence of commands) by a human operator. Restraint 350 can be mounted on an outside wall of loading dock 302 and/or a surface of pit 308.

A first command from a user is given to "lock" in place the vehicle supporting bed 314 (after the truck is appropriately situated at loading dock 302, for example) selectively couples (e.g., applies, removes, and/or relieves) pressurized air from the pressurized air supply to the restraint 350, which causes the restraint 350 to engage the locking station 352 (thus "locking" the vehicle). Using the restraint 350 to engage the locking station helps prevent an premature departure of the vehicle, and secures the bed 352 from moving away from the loading dock 302, for example, in response to forces encountered while handling material on bed 314 (including braking forces exerted by fork-lift machines).

A second command from a user is given to "unlock" the vehicle (such as when the task of loading and/or unloading the bed 314 of the truck has been completed and the truck is ready for departure). The second command selectively couples (e.g., applies, removes, and/or relieves) pressurized air from the pressurized air supply to the restraint 350, which causes the restraint 350 to disengage the locking station 352 (thus "unlocking" the vehicle).

In an alternate embodiment, a release of pressurized air is used to cause the restraint 350 to engage the locking station 352 (for example, by releasing pressurized air to selectively move a locking arm in opposition to a stored force such as a spring), and application of pressurized air is used to cause the restraint 350 to disengage the locking station 352 (for example, by applying pressurized air to selectively move a locking arm in accordance with a stored force such as a spring).

In yet another embodiment, the command to cause the restraint 350 to disengage the locking station 352 is generated in response to a command to pressurize the inflatable bag 320 (such as when raising the distal portion of ramp 304 to either allow a vehicle to approach or depart from a docked position where the distal portion of ramp 304 rests upon bed 314. Further, the command to engage the locking station 352 is generated in response to a command to depressurize the inflatable bag 320 (such as when the distal portion of ramp 304 is to be lowered to rest upon the bed 314 or after the vehicle supporting bed 314 has departed).

Pressurized air station 360 is provided in a location convenient to a user (such as upon the interior or exterior surface of the wall of loading dock 302) to be used for maintenance of the loading dock 320 and associated elements. For example, a user can (removeably) attach an air hose (not shown) to a user-accessible fitting 362 for the purpose of using compressed air to clean debris from pit 308. Fitting 362 can be located at a location adjacent to one or more loading docks 302 wherein the attached air hose is of sufficient length to reach the adjacent loading dock 302.

Using compressed air from pressurized air station 360 to remove of debris from pit 308 is facilitated because the fitting 362 can be conveniently coupled to air lines that, for example, are routed to the pit 308 for the purpose of inflating the inflatable air bag 320. Use of a hand-tool (not shown) such as an air wand (attached to a distal portion of an air hose having a proximal portion attached to the fitting 362) to deliver pressurized air for removal of debris (such as dirt, paper products, and leaves) allows a pressurized air stream to be directed towards difficult-to-reach portions of the pit 308 that exist when the pit 308 is populated with the illustrated elements (such as ramp 304, inflatable air bag 320, air valve unit 322, and cylinder 330).

Further, a user can (removeably) attach an air pressure gauge to the fitting 362 to manually read the air pressure of the pressured air system at location of the loading dock 302 for conveniently performing maintenance and trouble-shooting procedures. Fitting 362 is optionally a quick-release, check-valve fitting to allow for convenient coupling (and decoupling) of attachments, and to minimize the escape of pressurized air while coupling and decoupling attachments to the fitting 362.

Figure 4:
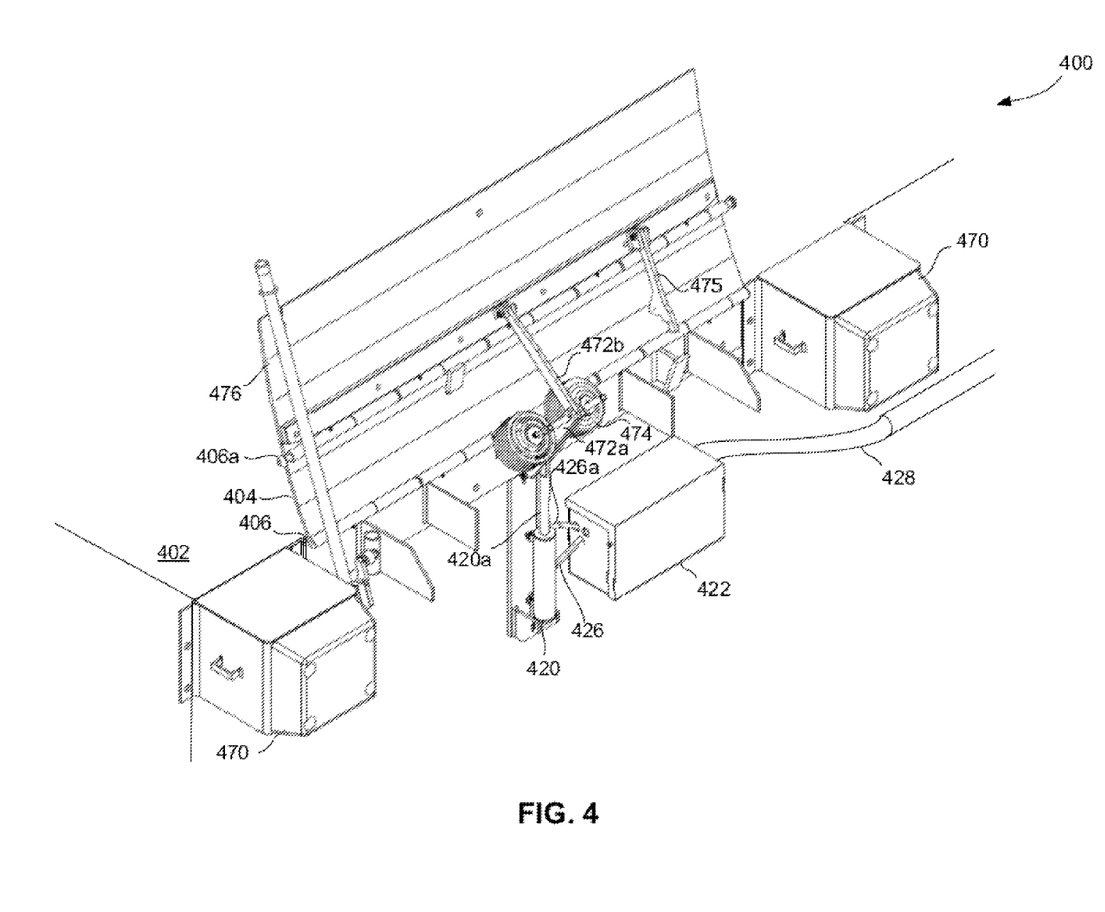
FIG. 4 is a schematic diagram illustrating an embodiment of a pneumatic edge-of-dock leveler of a dock leveling system.

FIG. 4 is a schematic diagram illustrating an embodiment of a pneumatic edge-of-dock leveler of a dock leveling system. The edge-of-dock leveler 400 is illustrated in isometric view and is arranged adjacently to an outer surface of loading dock 402 floor. The loading dock 402 includes a dock edge along which hinge 406 is arranged. Hinge 406 operates in conjunction with (or independently of) hinge 406a to lower or raise a loading ramp that includes lip plate 476 and center plate 404.

Air valve unit 422 (operating under control of a control unit such as user control unit 310) is arranged to selectively apply (e.g., couple) pressurized air from a pressurized air supply line 428 to pneumatic cylinder 420. Pneumatic cylinder 420 is arranged to (for example) extend piston arm 420a in a generally upwards direction when pressurized air is applied via air hose 426 and to retract piston arm 420a in a generally downwards direction when pressurized air is applied via air hose 426a.

Center plate 404 and lip plate 476 are illustrated in a "stored," upright position, which allows, for example, a truck to drive in reverse into bumper blocks 470 for the purpose of loading and/or unloading materiel from the bed of the truck. When the truck is properly docked, the distal edge of lip plate 476 is lowered by retracting piston arm 420a. Piston arm 420a is mechanically coupled to spring assembly 474 and lifting arm(s) 472a and 472b and lowers the distal edge of lip plate 476 as the piston arm 420a is being retracted. Extended link arm 475 is arranged to provide a mechanical stop to limit the downwards movement of the lip plate 476.

In an alternate embodiment, a relief valve (such as relief valve 346) coupled to pneumatic cylinder 420 can be used in place of air hose 426a. The relief valve can be opened to allow the mass of the center plate 404 and lip plate 476 to urge the ramp in a generally downwards direction under gravitational forces.

Center plate 404 and lip plate 476 are raised, for example, to allow a truck to depart from dock 402 after loading and/or unloading. Before the truck is allowed to depart, the distal edge of lip plate 476 is raised by extending piston arm 420a. Extending piston arm 420a raises the spring assembly 474 and lifting arm 472a and 472b, which raises the lip plate 476 and center plate 404 to the stored, upright position. The upwards extent of the travel of the piston arm 420a can be used to limit the degree to which the center plate 404 and lip plate 476 can be raised.

Figure 5:
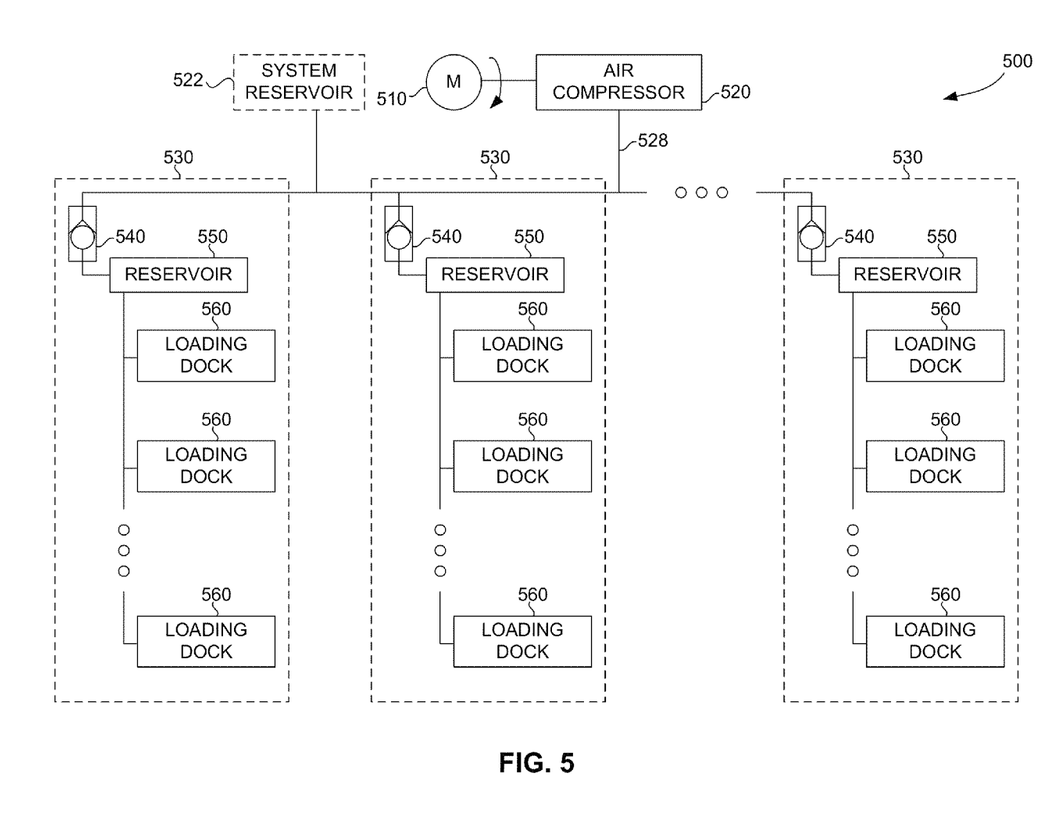
FIG. 5 is a schematic diagram illustrating an embodiment of a distributed reservoir of a centralized air supply dock leveling system.

FIG. 5 is a schematic diagram illustrating an embodiment of a distributed reservoir of a centralized air supply dock leveling system. Distributed reservoir system 500 includes a motor 510, and air compressor 520, and one or more distribution branches 530, each of which includes a check valve 540, a reservoir 550, and one or more loading docks 560.

Motor 510 is adapted to drive air compressor 520 and is typically electrically powered, although energy derived from fuel, steam, water, wind, animal-power, and the like can be used to drive the air compressor 520. In a situation where the use of electrical power is to be avoided (such as flooding, or when potentially explosive vapors might be encountered), the motor can be selected and/or positioned to avoid hazardous situations. Thus, for example, the motor and air compressor can be provided in a location that is away from the loading docks 560 and/or associated reservoirs 550. In such a situation, compressed air can be safely delivered to the loading docks 560 via air lines 528.

Motor 510 is selected to drive air compressor 520 to gradually pressurize the reservoirs 550 of the branches 530 of the distributed reservoir system 500. Thus, motor 510 (and compressor 520) need not be required to instantaneously provide compressed air sufficient to simultaneously supply the needs of one, two, or more branches of the distributed reservoir system 500. Accordingly, a relatively small-sized motor can be used to provide for a relatively large system when the aggregate usage (such as during a daily period) does not exceed the ability of the distributed reservoir system 500 to generate and/or store the compressed air in advance of the (peak) usage.

Use of the small-sized motor for all of the branches 530, for example, lowers acquisition and maintenance costs. Use of the small-sized motor also reduces the amperage of instantaneous current draw that would otherwise be encountered if each loading dock 560 were to be driven by an air compressor located at each loading dock 560.

Check valves 540 are used to partially isolate each branch 530 from other branches 530, as well as to allow pressurized air to pressurize the reservoir 550 of the associated branch. Thus, the respective reservoirs 550 of each branch 530 can be (relatively) gradually pressurized at the same time to reach the pressure capacity of each reservoir 550 (safely valves, not shown, are used to avoid over-pressurization of the reservoir 550 and other pressurized components). When usage of the compressed air stored in reservoir 550 occurs, the pressurized air can be replaced when the air pressure of the air lines 528 is higher than the pressure of the reservoir 550.

The check valves 540 also are arranged to prevent a "backwards" escape of pressurized air stored in the reservoir 550 towards the air compressor 520. When for example, the motor is disabled (such as during a hazardous condition) or does not have sufficient capacity to cause the air compressor to develop an air pressure that is greater than the pressure of the branch 530 in which the check valve 540 is arranged, the check valve 540 remains closed (which prevents the escape of air through the check valve 540). When the pressures of the reservoirs 550 (having lower pressures than an instant reservoir 550) reach and exceed the pressure of the instant reservoir 550, the check valve 540 to the instant reservoir 550 is opened, which allows the instant reservoir 550 to become more highly pressurized.

Reservoir 550 is selected to have sufficient capacity to provide compressed air in accordance with the expected usage of compressed air to the one or more loading docks 560 of the respective (associated) branch 530. The reservoir 550 is one or more storage tanks that, optionally, function as a single storage tank. Thus, the usage of compressed air for a loading dock 560 (such as raising a ramp 304, providing air to (automatic vehicle) restraint 350, and supplying air for pressurized air station 360) is provided by reservoir 550, which in turn is gradually recharged by air compressor 520.

System reservoir 522 can optionally be used to provide a supplemental and/or back-up (e.g., emergency) source of air in the event(s), for example, of the air compressor being unavailable, and/or the peak usage requirements of the (combined) loading docks. The capacity of system reservoir 522 can be selected to provide sufficient pressurized air so that the loading docks 560 can, for example, operate for a time that is estimated to be sufficient for power to be restored to the motor 510.

What is claimed is:

1. An inflatable-bag dock leveling system, comprising:
   a plurality of loading dock bays, each loading dock bay including a ramp that is arranged to pivot about a hinge affixed to a proximal end of the ramp and affixed to a portion of the loading dock bay adjacent to a pit formed in the loading dock bay, and including an inflatable bag arranged underneath the ramp so that a distal end of the ramp is raised or lowered in response to a degree to which the inflatable bag is inflated;
   a centralized air supply that is selectively coupled to the inflatable bag of each of the plurality of loading dock bays by actuating one of a plurality of valves, wherein each of the valves is coupled to a respective one of the inflatable bags;
   a local controller for each ramp, the local controller is arranged to actuate a selected valve of the plurality of valves to individually control the degree of inflation of the respective inflatable bag coupled thereto;
   a master controller that is coupled to each of the local controllers and arranged to coordinate functions of the locals controllers;
   wherein the master controller is arranged to receive user commands from a first control box for controlling the ramp of a first bay of the plurality of loading dock bays and a second control box for controlling the ramp of a second bay of the plurality of loading dock bays;
   wherein the master controller is arranged to change an operation of the dock leveling system in response to receiving user commands from the first control box for initiating an operation of the ramp of the first bay that overlaps with an operation initiated by the second control box for controlling the ramp of the second bay.

2. The system of claim 1, wherein the centralized air supply is coupled to the inflatable bags by an air line that is arranged so that a portion of the air line traverses across a portion of a loading dock wall that is above a bay door that is arranged in the loading dock wall.

3. The system of claim 1, wherein the change in operation of the dock leveling system is to assign priority to the first bay.

4. The system of claim 1, wherein the change in operation of the dock leveling system is to increase a rate of production of pressurized air.

5. The system of claim 1, wherein the operation initiated by the first control box is a "raise ramp" command and the operation initiated by the second control box is a "raise ramp" command.

6. The system of claim 5, wherein the operation initiated by the "raise ramp" command is terminated by a reading from a sensor that indicates that the ramp has been raised to a position higher than a position that is determined by a reading from a bed height sensor.

7. The system of claim 5, wherein the ramp is raised further by a subsequently received "raise ramp" command that is received after the operation initiated by the "raise ramp" command is terminated.

8. The system of claim 1, wherein an operation initiated by a received "lower ramp" command is terminated by a reading from a sensor that indicates that the ramp has been lowered to a position that is substantially equal to a position that is determined by a reading from a bed height sensor.

9. The system of claim 1, wherein the selected valve that is coupled to the respective inflatable bag is located in a control box.

10. The system of claim 1, wherein the selected valve that is coupled to the respective inflatable bag is located in a local control box.

11. An upgrade kit, comprising:
    an inflatable bag for each of a plurality of loading dock bays, each loading dock bay including a ramp hinged at a proximal portion, wherein the inflatable bag is adapted to be arranged underneath the ramp so that a distal end of the ramp is raised or lowered in response to a degree to which the inflatable bag is inflated;
    a centralized air supply that is adapted for coupling to the inflatable bag of each of the plurality of loading dock bays;
    a valve for coupling to each respective inflatable bag of the inflatable bags,
    a local controller for each ramp, each of the local controllers is adapted to actuate a selected valve of the valves to individually control the degree of inflation of each respective inflatable bag;
    a master controller that is coupled to each of the local controllers and arranged to coordinate functions of the local controllers;
        wherein the master controller is arranged to receive user commands from a first control box for controlling the ramp of a first bay of the plurality of loading dock bays and a second control box for controlling the ramp of a second bay of the plurality of loading dock bays;
        wherein the master controller is arranged to change an operation of the dock leveling system in response to receiving user commands from the first control box for initiating an operation of the ramp of the first bay that overlaps with an operation initiated by the second control box for controlling the ramp of the second bay.

12. The upgrade kit of claim 11, comprising air lines that are adapted to be mounted across a portion of a loading dock wall that is above a bay door that is arranged in the loading dock wall.

13. The upgrade kit of claim 11, wherein the valve for coupling to each respective inflatable bag is located in the control box that is adapted to control the respective inflatable bag.

14. A method for upgrading dock leveling systems, comprising:
- arranging an inflatable bag underneath a ramp in each of a plurality of loading dock bays, wherein the ramp is hinged at a proximal portion so that a distal end of the ramp is raised or lowered in response to a degree to which the inflatable bag is inflated;
- coupling a centralized air supply to the inflatable bag of each of the plurality of loading dock bays, wherein the centralized air supply is selectively coupled to one of the inflatable bags of the plurality of inflatable bags by actuating one of a plurality of valves, wherein each valve is coupled to a respective inflatable bag of the plurality of inflatable bags;
- using a local controller for each ramp to actuate a selected valve of the plurality of valves to individually control the degree of inflation of the respective inflatable bag coupled thereto;
- using a master controller that is coupled to each of the local controllers and arranged to coordinate functions of the local controllers;
- wherein the master controller is arranged to receive user commands from a first control box for controlling the ramp of a first bay of the plurality of loading dock bays and a second control box for controlling the ramp of a second bay of the plurality of loading dock bays;
- wherein the master controller is arranged to change an operation of the dock leveling system in response to receiving user commands from the first control box for initiating an operation of the ramp of the first bay that overlaps with an operation initiated by the second control box for controlling the ramp of the second bay.

15. The method of claim 14, comprising routing air lines across a portion of a loading dock wall that is above a bay door that is arranged in the loading dock wall.

16. The method of claim 14, comprising coupling a cylinder to the ramp to limit the rate at which the ramp is lowered.

17. The method of claim 14, comprising coupling an air velocity fuse to the inflatable bag to limit the rate of deflation of the bag.

18. The method of claim 14, wherein the inflatable bag is a pneumatic cylinder that is driven by selectively coupled air from the centralized air supply.

19. The method of claim 14, wherein the local controller is a mechanical linkage that is manipulated by a user.

20. The method of claim 14, comprising coupling a first check valve between a first reservoir of a first loading dock bay of the plurality of loading dock bays and coupling a second check valve between a second reservoir of a second loading dock bay of the plurality of loading dock bays, wherein the first check valve is arranged to prevent back flow of pressurized air from the first reservoir to the centralized air supply, and wherein the second check valve is arranged to prevent back flow of pressurized air from the second reservoir to the centralized air supply.

21. The method of claim 20, comprising providing a user-accessible pressurized air fitting adjacent to at least one of the loading dock bays.

22. The method of claim 14, wherein the local controller is arranged to actuate the selected valve to individually control the degree of inflation of the respective inflatable bag in an absence of electrical power.

23. The method of claim 14, wherein the local controller is arranged to actuate the selected valve to individually control the degree of inflation of the respective inflatable bag when a portion of at least one of the loading dock bays is submerged in water.

* * * * *